(12) United States Patent
Kaster

(10) Patent No.: US 8,380,417 B2
(45) Date of Patent: Feb. 19, 2013

(54) TRACTION CONTROL SYSTEM AND METHOD

(75) Inventor: Robert Kaster, White Lake, MI (US)

(73) Assignee: Robert Bosch GmbH, Stuttgart (DE)

( * ) Notice: Subject to any disclaimer, the term of this patent is extended or adjusted under 35 U.S.C. 154(b) by 719 days.

(21) Appl. No.: 12/572,765

(22) Filed: Oct. 2, 2009

(65) Prior Publication Data

US 2011/0082633 A1     Apr. 7, 2011

(51) Int. Cl.
*B60T 7/12* (2006.01)

(52) U.S. Cl. ........... 701/83; 701/74; 701/82; 303/113.2; 303/143

(58) Field of Classification Search ............ 701/70, 701/71, 74, 82, 83, 90; 303/10, 71, 77, 113.2, 303/143
See application file for complete search history.

(56) References Cited

U.S. PATENT DOCUMENTS

| | | |
|---|---|---|
| 4,792,011 A | 12/1988 | Stelter et al. |
| 5,383,718 A | 1/1995 | Burgdorf et al. |
| 6,000,488 A | 12/1999 | Atkinson |
| 6,371,234 B2 | 4/2002 | Yasuda |
| 7,101,313 B2 | 9/2006 | Kresse et al. |
| 7,302,333 B2 | 11/2007 | Steen et al. |
| 2004/0026991 A1 | 2/2004 | Suzuki et al. |
| 2006/0080023 A1 | 4/2006 | Hrovat et al. |
| 2007/0057573 A1* | 3/2007 | Abe ............................. 303/148 |
| 2007/0114837 A1* | 5/2007 | Kusano .......................... 303/10 |
| 2007/0255465 A1 | 11/2007 | Brown et al. |

\* cited by examiner

*Primary Examiner* — Gertrude Arthur Jeanglaude
(74) *Attorney, Agent, or Firm* — Michael Best & Friedrich LLP

(57) ABSTRACT

A traction control system includes a master cylinder containing brake fluid, braking devices configured to apply braking force to associated wheels of the vehicle, a brake pedal operable by a driver of the vehicle to generate braking force by pressurizing the brake fluid, and an inlet valves for storing pressurized brake fluid to apply and temporarily hold a braking force at a slipping driven wheel. A method of providing traction control for a vehicle includes manually switching the vehicle from a normal operating mode to a traction control mode, sensing the slippage of a driven wheel, applying a braking force to the slipping driven wheel in response to a driver of the vehicle pressing a brake pedal, maintaining the braking force on the slipping driven wheel after the brake pedal is released, and gradually releasing the braking force as the slipping driven wheel gains traction.

20 Claims, 8 Drawing Sheets

TRACTION CONTROL SYSTEM AND METHOD

BACKGROUND

The present invention relates to braking systems for vehicles. More particularly, the invention relates to traction control systems for vehicles that incorporate features and functions of the braking system to help the driver maintain the vehicle's wheels in traction with the road surface.

SUMMARY

In one embodiment, the invention provides a vehicle traction control system including a master cylinder containing a quantity of brake fluid, a plurality of braking devices configured to apply a braking force to an associated one of a plurality of wheels of the vehicle, a brake pedal operable in response to a driver of the vehicle to generate braking force by pressurizing the brake fluid, and means for storing brake fluid pressurized by application of the brake pedal to apply and temporarily hold a braking force at a slipping driven wheel.

In another embodiment the invention provides a method of operating a braking system of a vehicle to provide both a braking function and a traction control function. A master cylinder is provided coupled with a brake pedal of the vehicle and configured to generate hydraulic pressure transferable to a plurality of braking devices at a plurality of wheels of the vehicle to apply braking force to the plurality of wheels of the vehicle when a driver of the vehicle presses on the brake pedal. Hydraulic pressure is generated and a corresponding braking force is applied to each of the plurality of wheels of the vehicle in response to the driver of the vehicle pressing on the brake pedal. The braking force on each of the plurality of wheels is released in response to the brake pedal being released. Slipping of a driven one of the plurality of wheels is sensed. Hydraulic pressure is generated to selectively apply a braking force to only the driven wheel that was sensed to be slipping, the hydraulic pressure being generated without operating any pumps in the brake fluid circuit between the slipping driven wheel and the master cylinder.

In yet another embodiment, the invention provides a vehicle traction control system including a brake pedal operable by a driver of the vehicle, wherein the brake pedal is coupled to a plurality of braking devices, each of which is configured to apply a braking force to reduce the rotational speed of an associated wheel in response to the brake pedal being operated by the driver in a normal operating mode of the vehicle. The braking force at each of the plurality of braking devices is configured to terminate upon release of the brake pedal when the vehicle is in the normal operating mode. A driver-actuable switch is configured to change an operational mode of the vehicle from the normal mode to a traction control mode while the vehicle is stopped. Means are provided for identifying slipping of a driven wheel of the vehicle and for retaining a braking force supplied by the brake pedal on the slipping driven wheel after the brake pedal is released by the driver when the vehicle is in the traction control mode. Further means are provided for gradually releasing the braking force on the slipping driven wheel as the slipping driven wheel gains traction.

In yet another embodiment, the invention provides a method of providing a traction control feature in a vehicle. The vehicle is manually switched from a normal operating mode to a traction control mode. The slippage of a driven wheel is sensed. A braking force is applied to the slipping driven wheel in response to a driver of the vehicle pressing a brake pedal. The braking force is maintained on the slipping driven wheel after the brake pedal is released. The braking force is gradually released as the slipping driven wheel gains traction.

Other aspects of the invention will become apparent by consideration of the detailed description and accompanying drawings.

DETAILED DESCRIPTION

Figure 1:
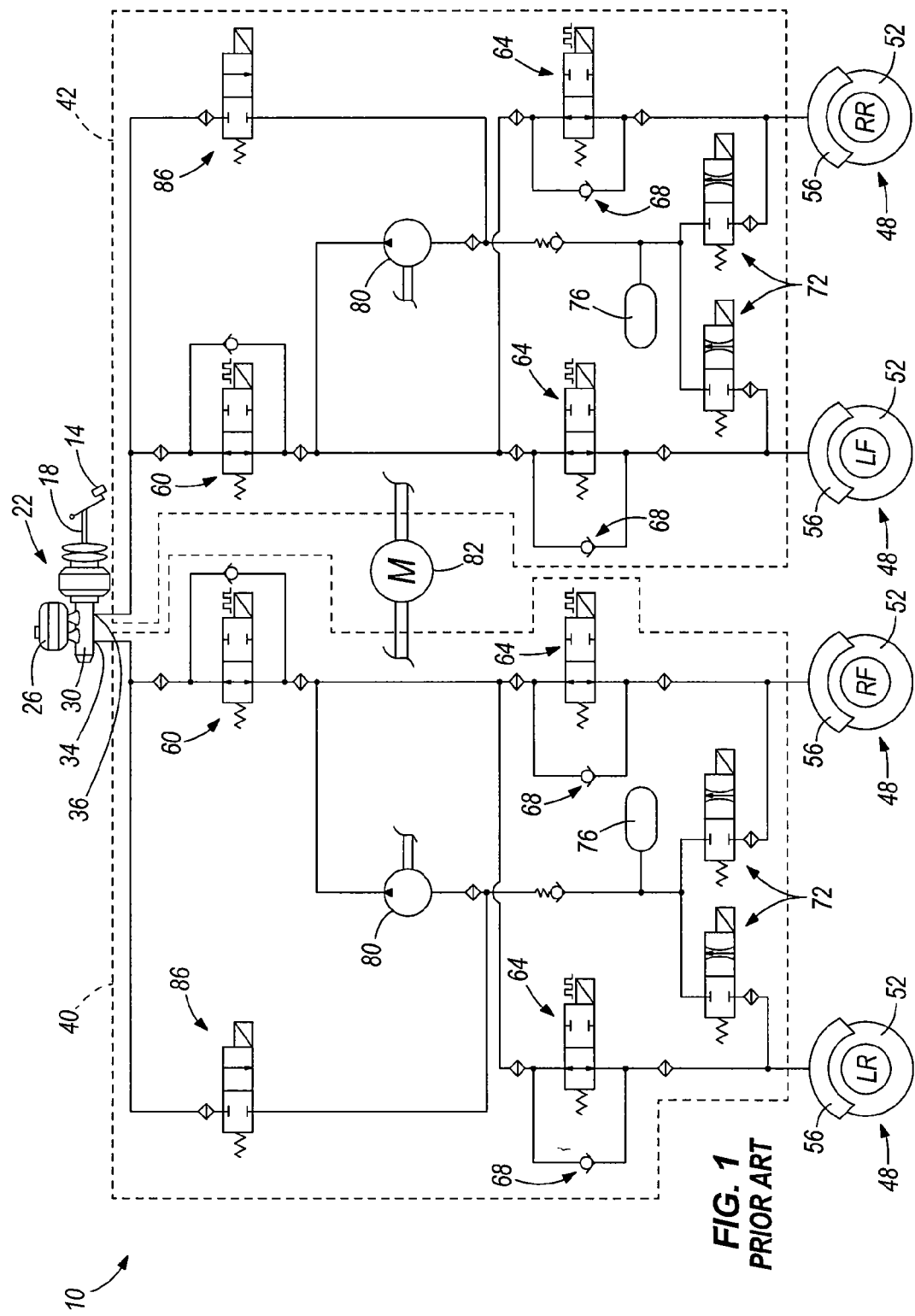
FIG. 1 is a schematic diagram illustrating a conventional braking system with anti-lock and traction control features. The braking system is shown in an at-rest state.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1-5 are schematic diagrams of an existing braking system 10 having anti-lock braking capability and traction control capability. The invention, as shown in the schematic diagrams of FIGS. 6 and 7 and described with reference to those figures below, is an improvement of the system shown in FIGS. 1-5. The existing braking system 10 is described first so that the improvements and advantages of the invention are better understood when introduced.

The braking system 10 includes a brake pedal 14 that is actuable by a driver of the vehicle (such as any typical automobile—not shown). The brake pedal 14 is actuated by pressure applied from the driver's foot when it is desired to slow or stop the vehicle, or to keep the vehicle in a stopped state once stopped. The brake pedal 14 is coupled to a piston shaft 18 that actuates two pistons within a master cylinder assembly 22. The master cylinder assembly 22 includes a reservoir 26 for containing a volume of hydraulic fluid ("brake fluid") and further includes a body 30 in which two separate chambers are formed, each containing one of the pistons that are mounted on the piston shaft 18. The master cylinder body 30 includes two outlets 34, 36—one from each of the chambers so that two independent brake fluid circuits 40, 42 are established for redundancy to maintain some braking ability in the event that one of the brake fluid circuits becomes inoperable.

The braking system 10 further includes a plurality of braking devices 48 for slowing and stopping the vehicle wheels from rotating. In the most typical construction, disc-type braking devices are utilized. Each disc-type braking device 48 includes a rotor 52 coupled for rotation with a wheel of the vehicle and a caliper 56 that selectively applies a squeezing pressure to the rotor 52 to slow the rotor 52 (and vehicle wheel) by friction. In a four-wheeled vehicle, the left-rear and right-front braking devices 48 are operated on the first brake circuit 40, and the left-front and right-rear braking devices 48 are operated on the second brake circuit 42.

Although different braking devices 48 are actuated by the brake circuits 40, 42, the layout and function of the brake circuits 40, 42 are identical. The types of braking devices 48 may vary from one braking system to another or within the braking system 10 (i.e., larger disc brakes for front wheels or disc-type front brakes with drum-type rear brakes). The size/type of the components within either brake circuit 40, 42 may also vary, but it will be understood that the second brake circuit 42 includes the same basic features and functions as the first brake circuit 40, which is described in detail. The reference numbers of all parts of the first brake circuit 40 are shared with the corresponding parts of the second brake circuit 42.

Figure 2:
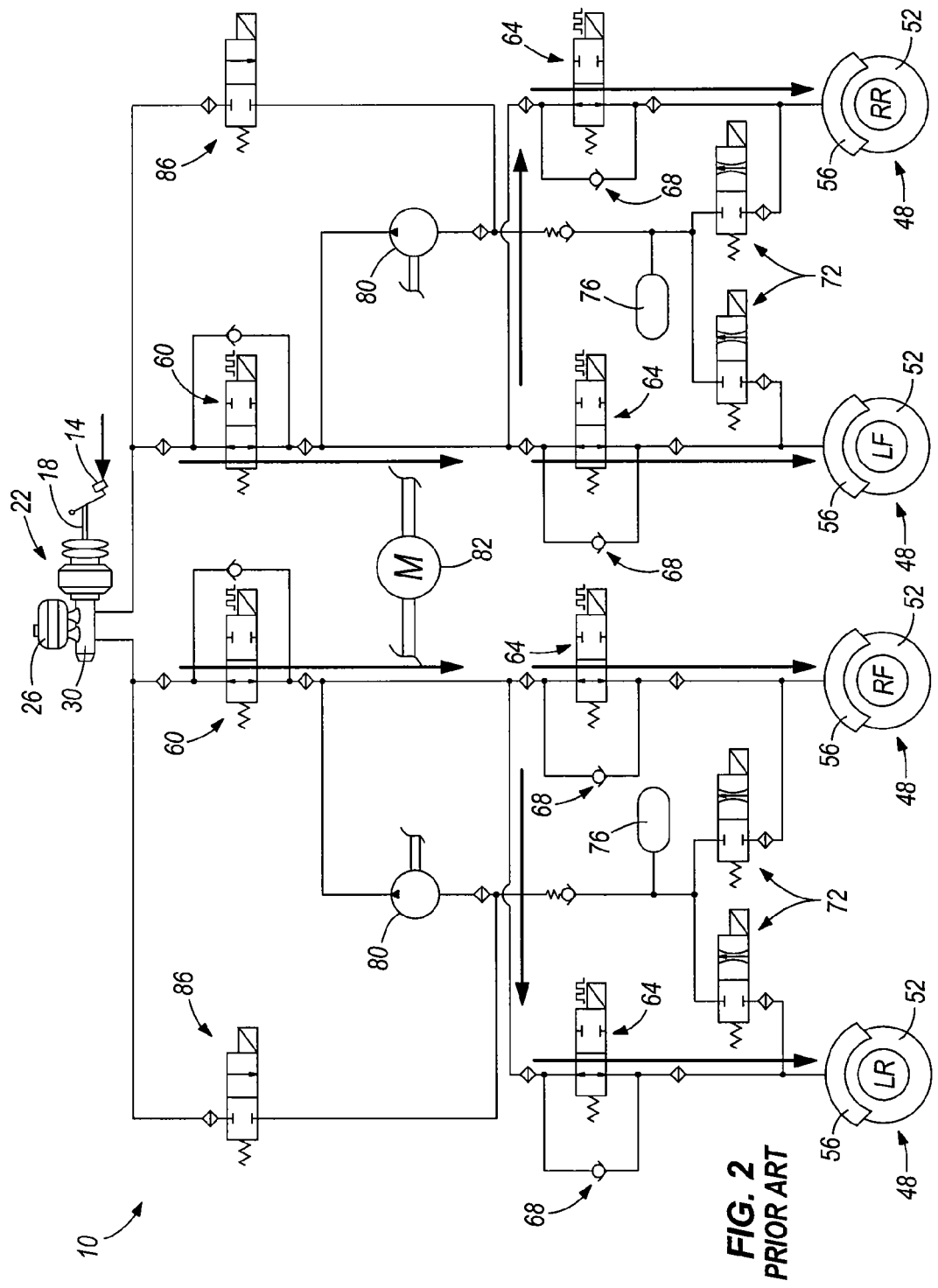
FIG. 2 is a schematic diagram of the conventional braking system of FIG. 1 shown during normal braking pressure build.

During normal braking operation, the brake fluid in the brake circuit 40 (and also in the brake circuit 42) must be compressed to hydraulically actuate the braking devices 48 as shown in FIG. 2. This is accomplished by movement of the pistons within the chambers of the master cylinder 22. Pressurized brake fluid in the first circuit 40 is in communication with each of the braking devices 48 through a single normally-open pilot valve 60 and separate normally-open inlet valves 64 that are in parallel with each other in a position "downstream" of the pilot valve 60 (i.e., closer to the braking devices 48). In parallel with each inlet valve 64 is a one-way check valve 68.

A normally-closed outlet valve 72 is provided in communication with each of the braking devices 48. When the system is operating normally and the brake pedal 14 is pressed by the driver, high pressure brake fluid is in communication with the braking devices 48 through the valves 60, 64. The normally-closed outlet valves 72 keep the high pressure brake fluid in communication with the braking devices 48, isolating the brake fluid supply path from the separate brake fluid return path (discussed later).

Figure 3:
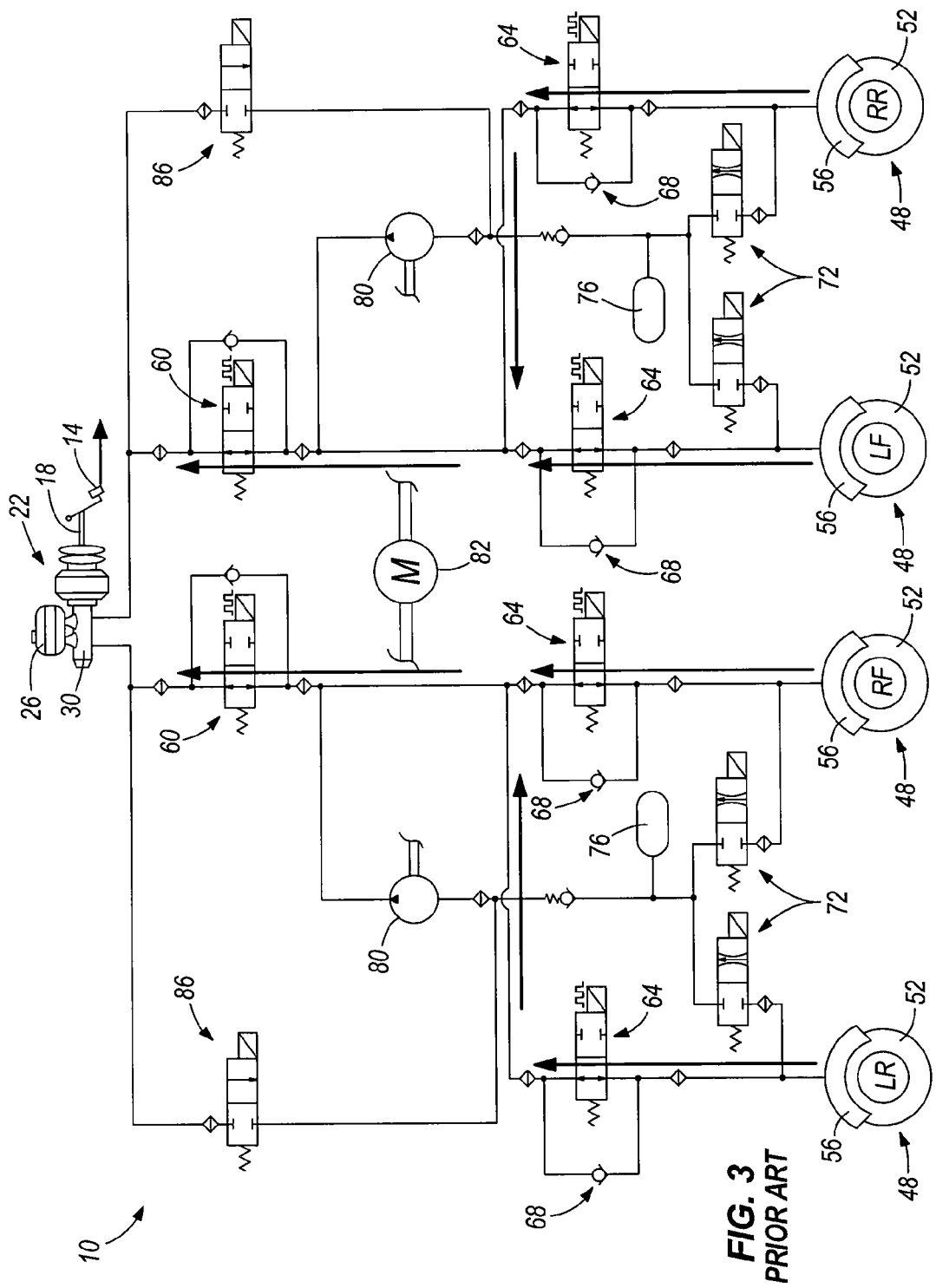
FIG. 3 is a schematic diagram of the conventional braking system of FIG. 1 shown during normal braking pressure release.

Under normal circumstances, when the driver releases the brake pedal 14, the pressure in the brake fluid is relieved by expanding back "upstream" into the master cylinder 22 through the same path that the brake pressure was originally supplied to the braking devices 48 (through the normally-open pilot valve 60 and the normally-open inlet valves 64—see FIG. 3). Thus, during normal braking, no valves of the brake circuit 40 need to be actuated whatsoever.

As well-known in the art, anti-lock braking is effected by sensing impending wheel lock (skidding on road surface) with a sensor and relieving a predetermined amount of brake pressure from the locked wheel(s) by opening the normally-closed outlet valve 72 associated with the locked wheel(s). This allows for better control of the vehicle during hard braking. Brake fluid released from the supply side to the return side through either of the outlet valves 72 is accumulated at an accumulator chamber 76 and can be later returned to the reservoir 26 of the master cylinder 22 by a self-priming pump 80 that is driven by a motor 82.

Next, the traction control function of the existing braking system 10 is described. The basic function of traction control is to apply selective braking force at a slipping wheel to maintain greater control of the vehicle through greater traction with the road surface. This is usually accomplished automatically or "on-the-fly" without input from the driver by using a sensor to monitor for wheel slip and then activating the braking system 10 as described below. Although the terms "slip" and "slipping wheel" are used herein, it should be understood that the various components (e.g., sensors, controller, controlled valves) available today may operate fast enough to virtually eliminate noticeable slipping or spinning.

Figure 4:
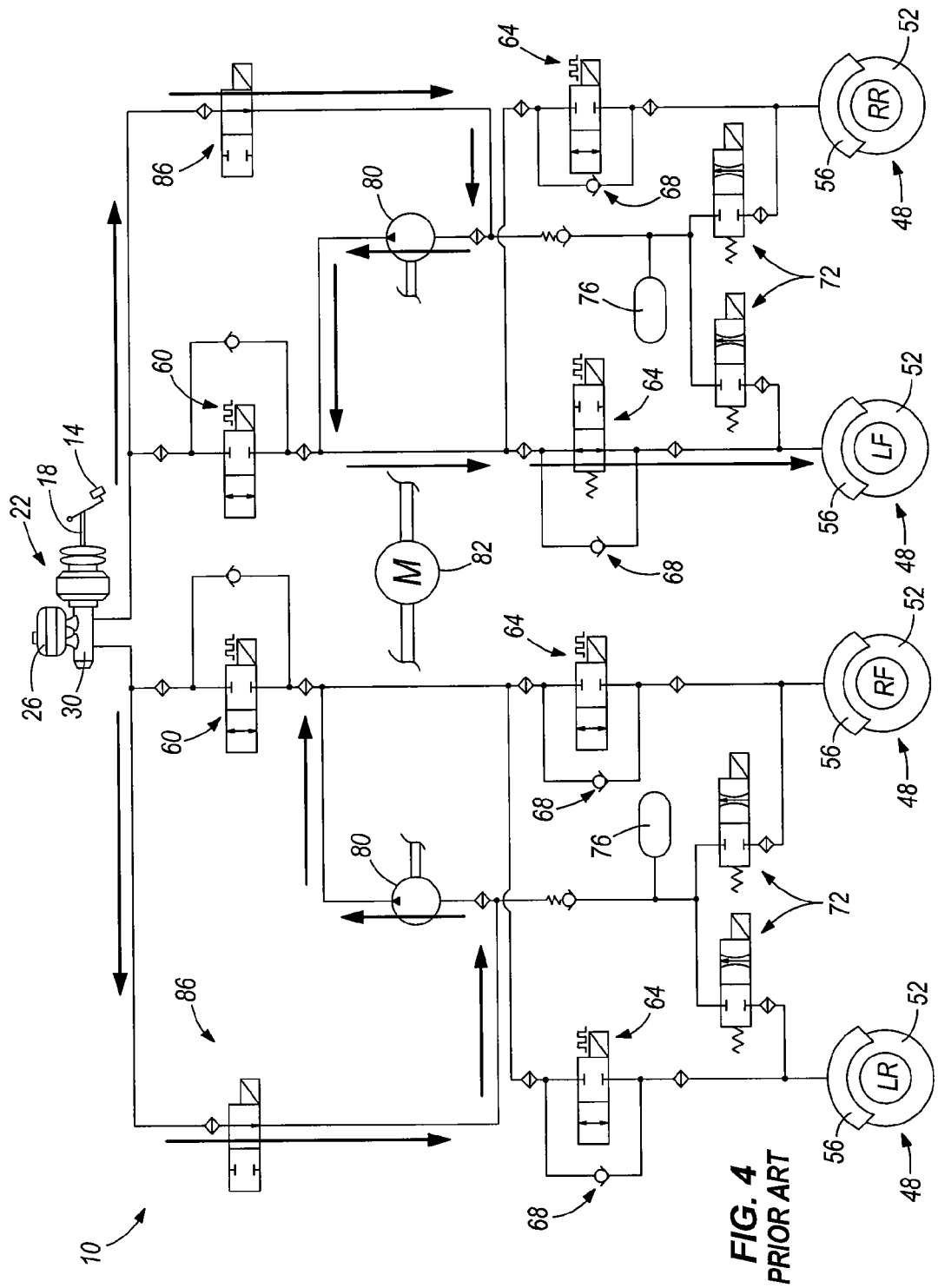
FIG. 4 is a schematic diagram of the conventional braking system of FIG. 1 shown during traction control pressure build.
Figure 5:
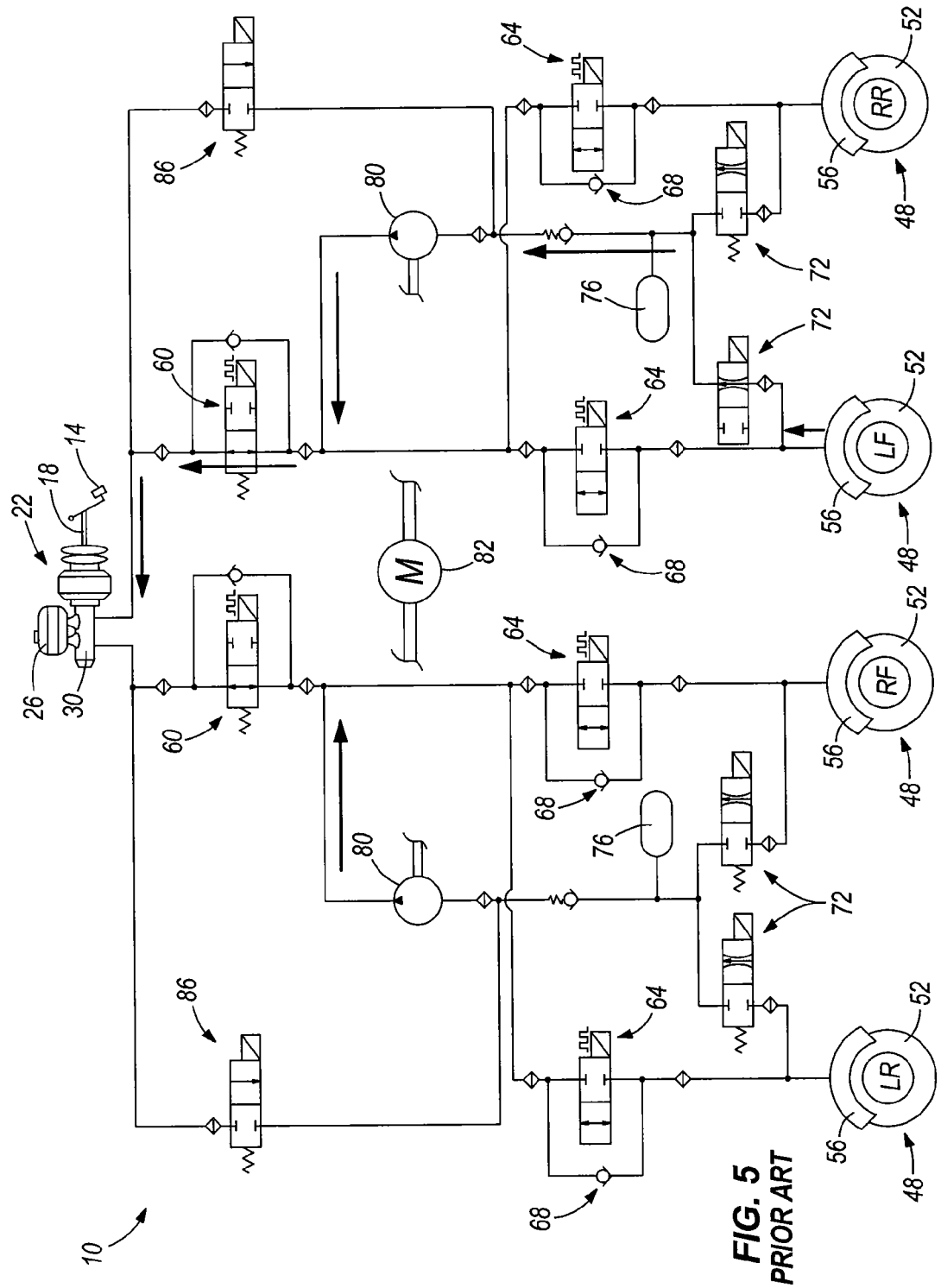
FIG. 5 is a schematic diagram of the conventional braking system of FIG. 1 shown during traction control pressure release.

FIG. 4 illustrates the braking system 10 building brake pressure for traction control functionality. Notice that the brake pedal 14 is not being pressed by the driver. The pilot valve 60 and the inlet valves 64 are all switched from their normally-open state to a closed state which prevents the transfer of brake fluid and the pressurization of brake fluid across the valves 60, 64. A prime valve 86 in parallel with the pilot valve 60 is switched from a normally-closed state to an open state. This allows the motor-driven pump 80 to be operated to draw brake fluid from the master cylinder 22 through the prime valve 86. Operation of the pump 80 supplies pressurized brake fluid to each of the inlet valves 64, which are closed until the vehicle's control unit senses wheel slip and demands braking force at one or more of the braking devices 48. When traction control braking is needed, the inlet valve(s) 64 are opened in a controlled manner to limit the slippage of the slipping wheel on the road surface. To release the pressure in the brake fluid that was pressurized during traction control type pressure build, the pilot valve 60 and the prime valve 86 are returned to their normal or at-rest states so that the pump 80 sends the brake fluid back to the master cylinder 22 through the pilot valve 60 (see FIG. 5).

In view of the above description, it should be clear that the pilot valve 60, the inlet valves 64, the outlet valves 72, the prime valve 86, and the pump 80 are all required in order to provide the braking system 10 with the desired anti-lock braking functionality and the "on-the-fly" traction control functionality. Thus, the braking system 10 is irreducibly complex for the functions required of it.

Figure 6:
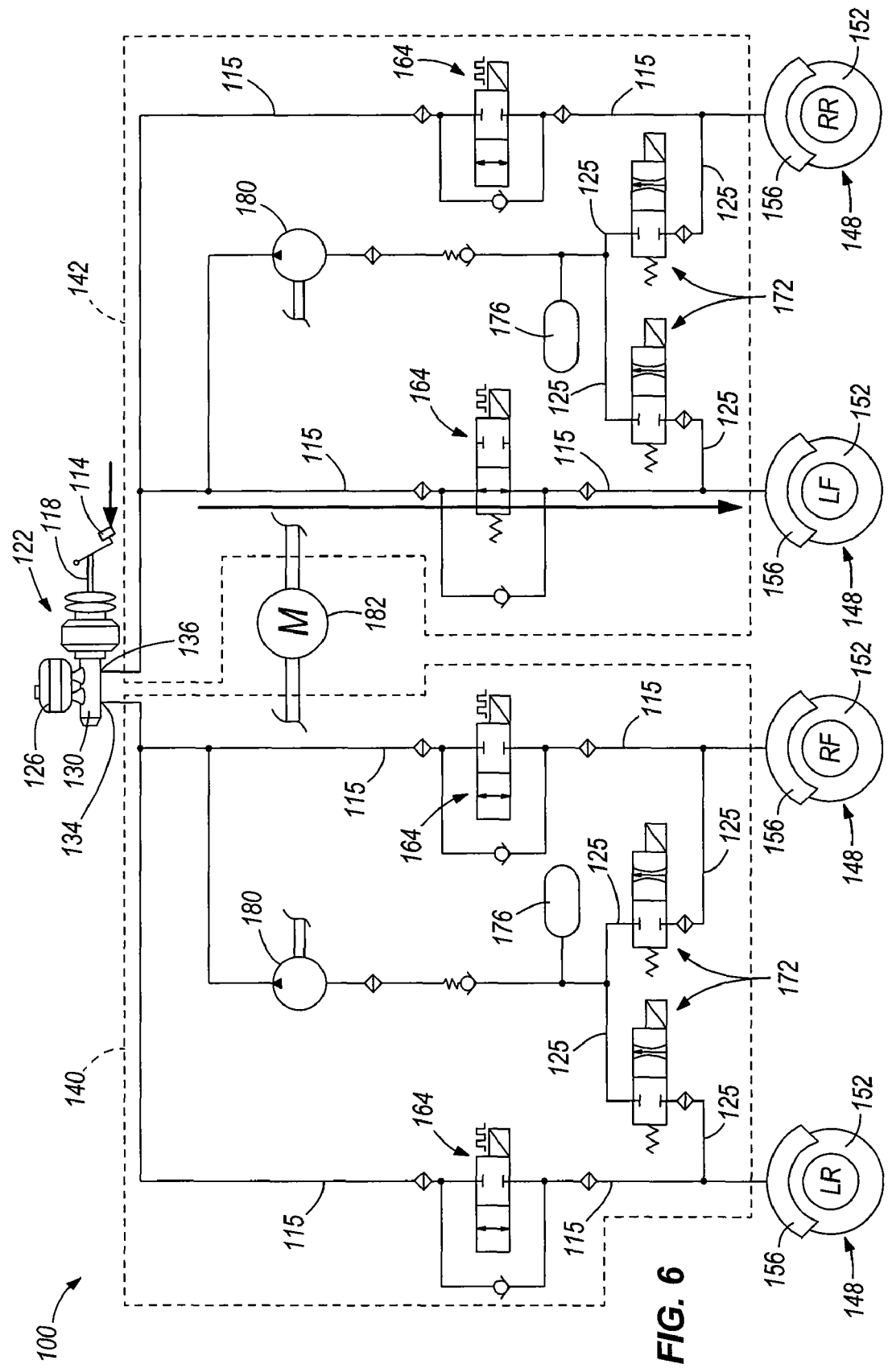
FIG. 6 is a schematic diagram illustrating a braking system of the invention with anti-lock and traction control features. The braking system is shown during traction control pressure build.
Figure 7:
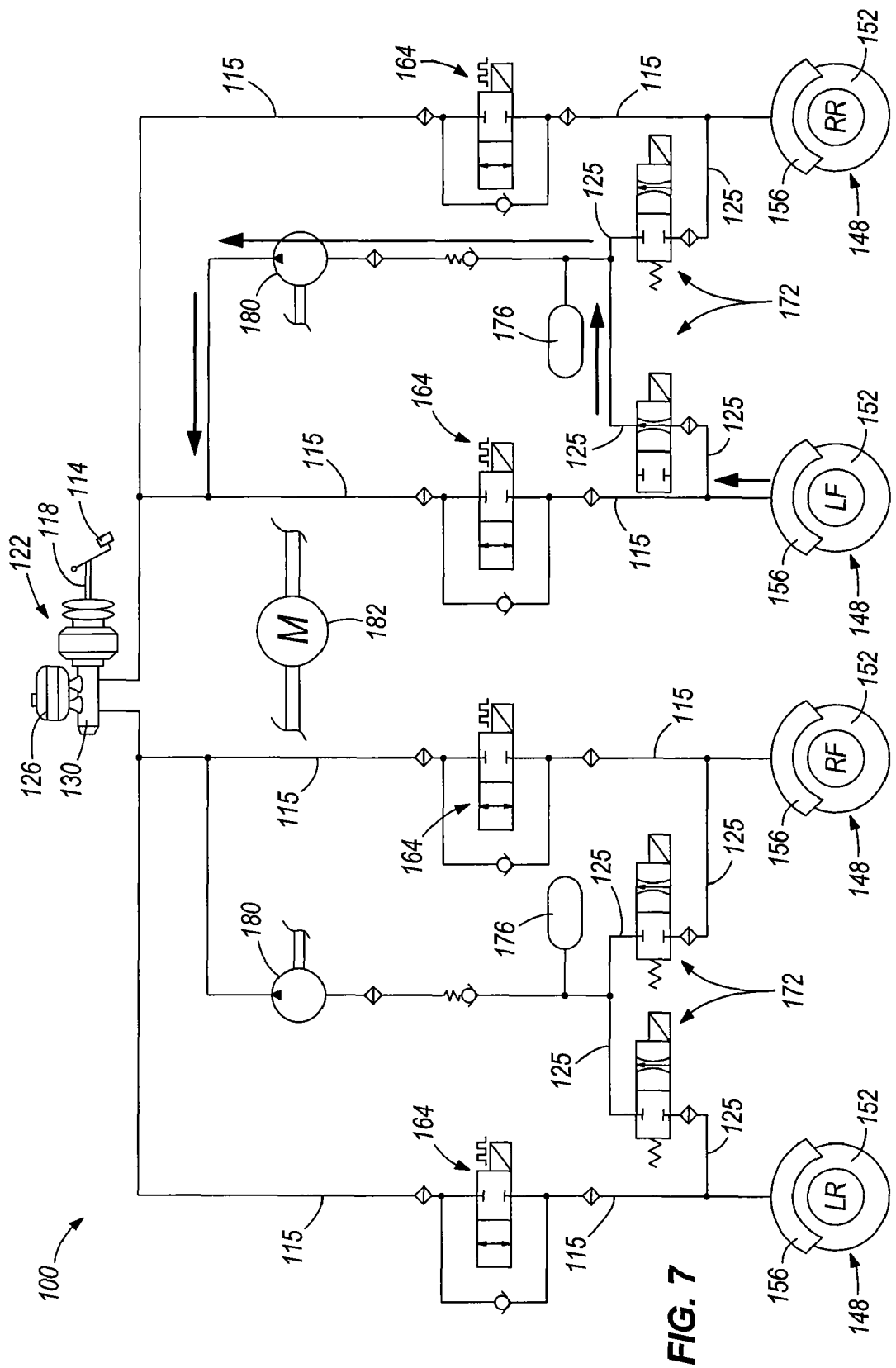
FIG. 7 is a schematic diagram of the braking system of FIG. 6 shown during traction control pressure release.

FIGS. 6 and 7 are schematic diagrams illustrating a braking system 100 of the invention that provides anti-lock braking functionality and limited driver-induced traction control functionality without either of the pilot valve 60 or the prime valve 86 of the existing braking system 10. Thus, the braking system 100 of the invention provides most of the capability of the existing system 10 with much less cost and complexity. The braking system 100 and its various functions are discussed in greater detail below. Some details of the components and functionality of the brake system 100 is common with the braking system 10 and may not be repeated. Reference is made to the above description. Furthermore, elements of the brake system 100 that are common with elements of the brake system 10 of FIGS. 1-5 are given the same reference number, incremented by 100 in FIGS. 6 and 7.

The braking system 100 of FIGS. 6 and 7 (and the vehicle in which the braking system 100 is implemented) operates in a normal mode, an anti-lock braking mode, and a traction control mode. In normal mode, the driver presses on the brake pedal 114 and hydraulic pressure in the brake fluid is generated at the master cylinder 122 and conveyed along individual brake fluid supply lines 115 through the normally-open inlet valves 164 associated with each braking device 148 so that the braking device 148 is actuated to slow/stop the corresponding vehicle wheel. In one construction, this can occur by a hydraulically actuated brake caliper 156 that is actuated by the pressurized brake fluid to squeeze or clamp onto the brake disc or rotor 152 that rotates with the wheel. Alternate braking devices may operate in different ways while still falling within the scope of the invention. In normal mode, when the driver releases the brake pedal 114, the pressure in the brake fluid subsides by expanding back "upstream" into the master cylinder 122 through the same path that the brake pressure was originally supplied to the braking devices 148 (through the normally-open inlet valves 164 along the brake fluid supply lines 115). Thus, like with the braking system 10 of FIGS. 1-5, no valves are actuated whatsoever during operation in normal mode.

Anti-lock braking is also carried out in much the same way as with the braking system 10 of FIGS. 1-5. When braking-induced wheel lock is sensed (or sensed to be imminent), brake pressure is released in a controlled manner from the affected braking device(s) 148 via the associated outlet valve (s) 172. Excess brake fluid that is bled through the outlet valve(s) 172 during anti-lock braking operation is fed through brake fluid return lines 125 to the accumulator chamber 176 and is later returned to the master cylinder 122 by the motor-driven self-priming pump 180.

During traction control mode, the braking system 100 provides the same basic function as the existing braking system 10 in that brake pressure is applied to a slipping wheel and the brake pressure is gradually reduced as the slipping wheel regains traction with the road surface. However, because the braking system 100 does not include the pilot valve 60 or the prime valve 86 of the existing braking system 10, the braking system 100 does not build and retain fluid pressure in the braking circuit(s) 140, 142 for later gradual application to the braking device(s) 148 while the vehicle is in motion. Thus, the traction control mode of the braking system 100 does not operate "on-the-fly" to automatically intervene during normal driving, and is instead manually selected and the pressure in the hydraulic brake fluid is manually generated.

Figure 8:
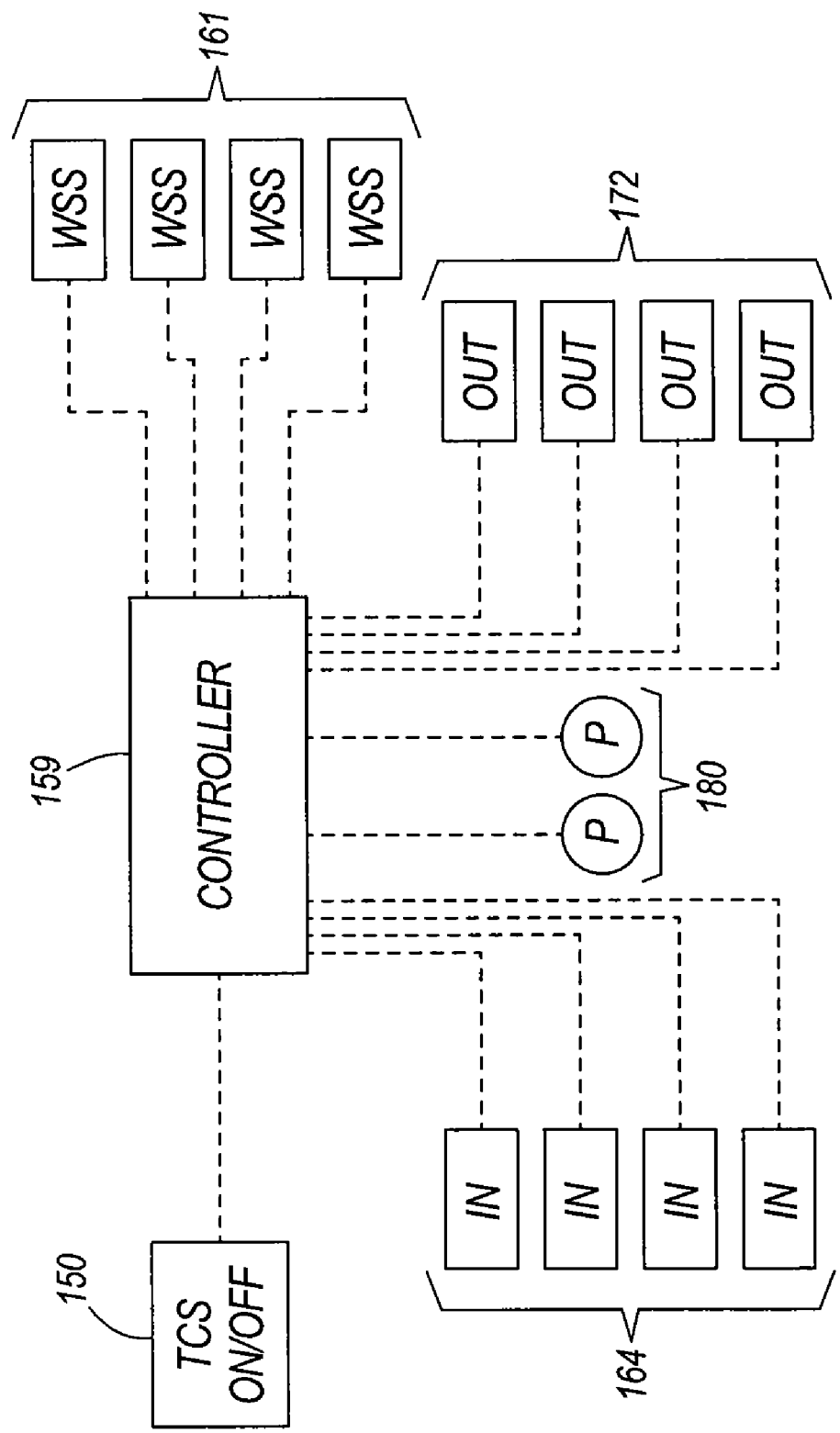
FIG. 8 is a schematic diagram illustrating the parameters controlling and controlled by the braking system of FIGS. 6 and 7.

The driver may manually put the braking system 100 into traction control mode when the vehicle becomes stuck on a slick or loose road surface such as ice, mud, etc. or when the vehicle becomes stuck due to being off of the road surface. Thus, the traction control mode of the braking system 100 serves to enable the driver to maneuver the vehicle out of a stuck condition once the driver realizes that the vehicle has become stuck. For this purpose and referring now to FIG. 8, the brake system 100 is provided with an input such as a push-button-actuated switch 150 that is marked "TCS On/Off", "Vehicle Stuck", "Manual Traction Control" etc. and that is actuable by the driver of the vehicle to put the braking system 100 into traction control mode. The switch 150 is coupled to a controller 159, such as the vehicle's main control module, that is configured to control the valves 164, 172 of the braking system 100. The controller 159 may be the same controller that controls the outlet valves 172 during anti-lock braking action. As shown in FIG. 8, the controller 159 may be in communication with various sensors such as wheel speed sensors (WSS) 161 at each wheel so that information regarding each wheel's speed is conveyed to the controller 159 for enacting the proper actuation of the valves 164, 172 during anti-lock braking action and traction control action.

For example, if the controller 159 receives signals from the wheel speed sensors 161 indicating that a slip threshold has been exceeded for one or more wheels (i.e., rotating significantly slower than one or more of the other wheels during braking), the controller 159 is configured to identify the wheel that has inadequate traction and requires anti-lock operation. The controller 159 signals to the outlet valve 172 associated with the appropriate wheel(s) to relieve brake pressure at the corresponding brake device(s) 148 until the wheel speeds are within the slip threshold. The monitoring of the wheel speeds and activation of the outlet valve(s) 172 may take place many times per second so that maximum braking performance is achieved.

In the event that the vehicle becomes stuck or one or more driven wheels are sensed to be spinning, the controller 159 receives signals from the wheel speed sensors 161 so that the spinning wheel(s) can be identified. As used herein a "spinning" wheel is a driven wheel that is or has been sensed to be rotating faster than a rate corresponding to the vehicle's rate of travel, although the "spinning wheel" may not be perceptibly spinning or may have stopped spinning. The driver actuates the switch 150 to turn the traction control system on. The controller 159 recalls which driven wheel(s) were spinning. The controller 159 closes all of the inlet valves 164 for the wheel(s) that were not sensed to be spinning (including all non-driven wheels and any driven wheel that was not sensed to be spinning). This action allows braking force to be targeted to only the spinning wheel(s). FIGS. 6 and 7 illustrate an example in which the left-front wheel is sensed to be spinning while the other three wheels are not. Accordingly, in this example, the inlet valves 164 associated with the left-rear, right-front, and right-rear wheels are actuated to move to the closed state.

When the traction control system is on, the braking system 100 enters a dedicated mode for getting the vehicle out of a stuck condition. The traction control mode is not suitable for regular driving of the vehicle, and in some constructions is only able to be actuated when the vehicle is stopped. With the braking system 100 in the traction control mode, the driver presses on the brake pedal 114 to generate pressure in the braking circuits 140, 142. However, hydraulic pressure is only transmitted to the braking device(s) 148 that are not blocked by closed inlet valves 164. Thus, in the example of FIGS. 6 and 7, braking force is only applied at the braking device 148 associated with the slipping left-front wheel. The driver may be prompted (e.g., by the controller 159) to press on the brake pedal 114 by a message on a vehicle display after the traction control mode is activated. Because the hydraulic pressure is generated manually by the driver pressing on the brake pedal 114, no pumps (e.g., the pump 180 in the corresponding brake fluid circuit 142 between the slipping wheel and the master cylinder 122) are operated to build hydraulic brake fluid pressure for traction control.

After the braking force is generated at the braking device(s) 148 of the slipping wheel(s), the brake pedal 114 is released. In some constructions, the vehicle's display may prompt the driver that the brake pedal 114 can be released. After the braking force has been established, and before the driver releases pressure from the brake pedal 114, any inlet valve(s) 164 that were open during the building of hydraulic brake pressure are closed. As shown in FIG. 7, the inlet valve 164 for the left-front braking device 148 has moved from the open state to the closed state. Thus, the braking device 148 for the left-front wheel is activated to apply braking force to the wheel, and the brake pressure in the circuit 142 is trapped between the inlet valve 164 and the braking device 148 for the left-front wheel so that the braking force initially generated by the driver's actuation of the brake pedal 114 is temporarily held without further interaction from the driver.

After releasing the brake pedal 114, the driver may press on the accelerator pedal (not shown) in order to move the vehicle. The braking force at the slipping wheel(s) (the left-front wheel in the example of FIGS. 6 and 7) is gradually released to allow an increasing amount of driving power to reach the slipping wheel as the vehicle begins to move successfully out of the stuck condition. The gradual release of braking force is accomplished by controlling gradual or pulsed opening of the outlet valve 172 to gradually release brake fluid that has been trapped between the inlet valve 164 and the braking device 148, which relieves hydraulic pressure in the trapped brake fluid and lessens the amount of the braking force.

If the first attempt to move the vehicle out of the stuck condition is unsuccessful or the vehicle becomes stuck again, the manual traction control mode is re-activated by the driver. The driver may be required to actuate the switch 150 again and will re-pressurize the brake fluid by pressing on the brake pedal 114 again. This process can be repeated as necessary to release the vehicle from the stuck condition. Once the vehicle regains normal traction, as sensed by the wheel speed sensors 161, the manual traction control mode is automatically shut off and the vehicle returns to the normal mode in which braking only occurs while pressure on the brake pedal 114 exists (i.e., brake pressure is not stored).

Optionally, in some constructions, the structure of the brake system 100 is further simplified while retaining traction control functionality by removing the anti-lock braking feature. This allows the elimination of the pumps 180, the motor 182, and the accumulator chambers 176 from the illustrated braking system 100. The manual traction control functionality remains in-tact as described above. Thus, a braking system can be provided with traction control functionality with a minimum of hardware.

Various features and advantages of the invention are set forth in the following claims.

What is claimed is:

1. A traction control system for a vehicle, the traction control system comprising:
    a master cylinder containing a quantity of brake fluid;
    a plurality of braking devices, each configured to apply a braking force to an associated one of a plurality of wheels of the vehicle;
    a brake pedal operable in response to a driver of the vehicle to generate braking force by pressurizing the brake fluid; and
    means for storing brake fluid pressurized by application of the brake pedal to apply and temporarily hold a braking force at a slipping driven wheel.

2. The traction control system of claim 1, further comprising a driver-actuable switch for changing an operational mode of the vehicle from a normal mode to a traction control mode while the vehicle is stopped, wherein braking force generated by the brake pedal is released when the brake pedal is released in the normal mode, and wherein braking force generated by the brake pedal is maintained by the storing means after the brake pedal is released in the traction control mode.

3. The traction control system of claim 1, further comprising means for identifying wheel slippage and means for gradually releasing the temporarily held braking force as the slipping driven wheel gains traction.

4. The traction control system of claim 3, wherein the means for storing pressurized brake fluid includes a first valve positioned along a brake fluid supply line between the master cylinder and the braking device of the slipping driven wheel, the first valve being configured to switch from an open condition to a closed condition after the braking force has been established at the slipping driven wheel.

5. The traction control system of claim 4, wherein the means for gradually releasing the temporarily held braking force includes a second valve positioned along a brake fluid return line between the braking device of the slipping driven wheel and the master cylinder, the second valve being configured to gradually relieve pressure in the stored brake fluid as the slipping driven wheel gains traction.

6. A method of operating a braking system of a vehicle to provide both a braking function and a traction control function, the method comprising:
    providing a master cylinder coupled with a brake pedal of the vehicle and configured to generate hydraulic pressure transferable through one or more brake fluid circuits to a plurality of braking devices at a plurality of wheels of the vehicle to apply braking force to the plurality of wheels of the vehicle when a driver of the vehicle presses on the brake pedal;
    generating hydraulic pressure and applying a corresponding braking force to each of the plurality of wheels of the vehicle in response to the driver of the vehicle pressing on the brake pedal;
    releasing the braking force on each of the plurality of wheels in response to the brake pedal being released;
    sensing that a driven one of the plurality of wheels is slipping; and
    generating hydraulic pressure to selectively apply a braking force to only the driven wheel that was sensed to be slipping, wherein hydraulic pressure is generated in the corresponding brake fluid circuit for the slipping driven wheel without operating any pumps in the brake fluid circuit between the slipping driven wheel and the master cylinder.

7. The method of claim 6, wherein hydraulic pressure for braking the slipping driven wheel is generated by the application of pressure on the brake pedal by the driver.

8. The method of claim 7, further comprising maintaining the hydraulic pressure for the slipping driven wheel after the brake pedal is released.

9. The method of claim 8, wherein maintaining the hydraulic pressure for the slipping driven wheel includes switching an inlet valve positioned along a brake fluid supply line from an open condition to a closed condition after the hydraulic pressure has been generated.

10. The method of claim 9, further comprising gradually releasing the hydraulic pressure for the slipping driven wheel as the slipping driven wheel gains traction.

11. A traction control system for a vehicle, the traction control system comprising:
    a brake pedal operable by a driver of the vehicle, wherein the brake pedal is coupled to a plurality of braking devices, each of which is configured to apply a braking force to reduce the rotational speed of an associated wheel in response to the brake pedal being operated by the driver in a normal operating mode of the vehicle, the braking force at each of the plurality of braking devices being terminated upon release of the brake pedal when the vehicle is in the normal operating mode;
    a driver-actuable switch for changing an operational mode of the vehicle from the normal mode to a traction control mode while the vehicle is stopped;
    means for identifying slipping of a driven wheel of the vehicle;
    means for retaining a braking force supplied by the brake pedal on the slipping driven wheel after the brake pedal is released by the driver when the vehicle is in the traction control mode; and
    means for gradually releasing the braking force on the slipping driven wheel as the slipping driven wheel gains traction.

12. The traction control system of claim 11, wherein the plurality of braking devices is a plurality of hydraulically actuated braking devices, each of which is coupled to a master cylinder.

13. The traction control system of claim 12, wherein the means for retaining the braking force after the brake pedal is released includes a first valve positioned along a brake fluid supply line between the master cylinder and the braking device of the slipping driven wheel, the first valve being configured to switch from an open condition to a closed condition to store hydraulic pressure after the braking force has been established at the slipping driven wheel.

14. The traction control system of claim 13, wherein the means for gradually releasing the braking force includes a second valve positioned along a brake fluid return line between the braking device of the slipping driven wheel and the master cylinder, the second valve being configured to gradually relieve the stored hydraulic pressure as the slipping driven wheel gains traction.

15. The traction control system of claim 14, further comprising a controller responsive to the driver-actuable switch to change the operating mode of the vehicle, the controller further being configured to operate the first and second valves.

16. A method of providing a traction control feature in a vehicle, the method comprising:

manually switching the vehicle from a normal operating mode to a traction control mode;

sensing the slippage of a driven wheel;

applying a braking force to the slipping driven wheel in response to a driver of the vehicle pressing a brake pedal;

maintaining the braking force on the slipping driven wheel after the brake pedal is released; and gradually releasing the braking force as the slipping driven wheel gains traction.

17. The method of claim 16, wherein the vehicle is switched from the normal operating mode to the traction control mode when the vehicle is stopped.

18. The method of claim 16, wherein applying the braking force includes generating hydraulic pressure via driver-applied force on the brake pedal.

19. The method of claim 18, wherein maintaining the braking force on the slipping driven wheel includes switching an inlet valve positioned along a brake fluid supply line from an open condition to a closed condition to store the hydraulic pressure generated by the driver-applied force on the brake pedal.

20. The method of claim 19, wherein gradually releasing the braking force includes gradually relieving the stored hydraulic pressure as the slipping driven wheel gains traction.

* * * * *

UNITED STATES PATENT AND TRADEMARK OFFICE
CERTIFICATE OF CORRECTION

| | | |
|---|---|---|
| PATENT NO. | : 8,380,417 B2 | Page 1 of 1 |
| APPLICATION NO. | : 12/572765 | |
| DATED | : February 19, 2013 | |
| INVENTOR(S) | : Robert Kaster | |

It is certified that error appears in the above-identified patent and that said Letters Patent is hereby corrected as shown below:

On the Title page, line 5 under the ABSTRACT:   Replace the word [valves] with --valve--

Signed and Sealed this
Fourth Day of June, 2013

Teresa Stanek Rea
*Acting Director of the United States Patent and Trademark Office*